PORTABLE YARN BONDING DEVICE

Filed June 9, 1954 4 Sheets-Sheet 1

INVENTORS
NAI CHONG CHANG
ROLAND E. LANGLOIS
BY W. Russell Greenwood
ATTORNEY

Nov. 12, 1957 NAI-CHONG CHANG ET AL 2,812,795

PORTABLE YARN BONDING DEVICE

Filed June 9, 1954 4 Sheets-Sheet 2

INVENTORS.
NAI CHONG CHANG
ROLAND E. LANGLOIS
BY
W. Russell Greenwood
ATTORNEY

Nov. 12, 1957 NAI-CHONG CHANG ET AL 2,812,795

PORTABLE YARN BONDING DEVICE

Filed June 9, 1954 4 Sheets-Sheet 3

INVENTORS
NAI CHONG CHANG
ROLAND E. LANGLOIS

BY W Russell Greenwood

ATTORNEY

INVENTORS.
NAI CHONG CHANG
ROLAND E. LANGLOIS
BY
W. Russell Greenwood
ATTORNEY

United States Patent Office 2,812,795

Patented Nov. 12, 1957

2,812,795

PORTABLE YARN BONDING DEVICE

Nai-Chong Chang, Warwick, and Roland E. Langlois, West Warwick, R. I., assignors, by mesne assignments, to A. B. Carter, Incorporated, Gastonia, N. C., a corporation of North Carolina Application June 9, 1954, Serial No. 435,404

21 Claims. (Cl. 154—1.7)

This invention relates to a device for uniting or "bonding" together the ends of strands used for various purposes in the textile industries, such as yarns and threads, and is concerned more particularly with a novel device which may be either hand-operated or by power means, and by the use of which the ends of two yarns or textile threads may be joined together firmly without the use of a tied knot, which is the conventional method of uniting two yarns or textile threads.

In a variety of operations practiced in textile mills, particularly in spooling, winding, spinning, and warping, it is common practice to tie the ends of two yarns or textile threads by means of certain types of knots which are designed for the particular characteristics of the yarns or threads which are to be tied together, the most common types of knot used in the trade being a so-called "chicken-head" knot or spooler's knot, and a small flat knot which is known as a "weaver's knot." Prior to the present invention, there have been used and suggested for use a number of hand-operated knot tying devices or knotters capable of forming and tying mechanically either of the above-mentioned knots which are used particularly on yarn composed of natural fibers, or to tie special types of knots which are designed especially for use on yarn composed of synthetic fibers the knotting of which is difficult because of the slippery character of the strands and cannot be firmly held by conventional knots accepted by the trade or by the small flat "weaver's knot." Glass yarn due to its nature, however, cannot be tied or knotted. In practice, the presence of knots in yarn or textile thread is highly objectionable since by their nature and bulk they cause trouble and waste in the subsequent operations to which the yarn and thread is subjected inasmuch as the knot which tends to hang up on conventional guides, heddles and needle hooks in the weaving or knitting of such knotted yarn or thread causes frequent breakage thereof in such fabricating machinery, and furthermore, in most instances, the knot eventually shows up as an imperfection in the completed fabric by standing out noticeably thereby resulting in what is known as a "seconds" product.

It accordingly is one of the objects of the present invention to provide a novel method and means for effecting a union of the ends of two yarns or strands without the use of a knot and in which a flexible joint of high strength connecting the yarn ends will be formed which will maintain general continuity of yarn and will not obstruct the running of the yarns or strands through all conventional textile machinery in which the yarn may be used in subsequent fabricating operations.

Another object of the present invention is to provide a device which eliminates the tying of knots and the use of the knotter mechanisms above-described, and one that is capable of mechanically effecting the firm union or joining together by use of an adhesive cement yarns or strands of all types, whether they are both composed of natural fibers, or of synthetic fibers, or of glass.

A still further object of the invention is to provide a device so constructed and arranged as to mechanically effect the bonding or adhesive union of the ends of two yarns or strands in a rapid and practical manner to form a strong lapped joint of predetermined length.

Further objects and advantages of the invention will appear from the following description when taken in conjunction with the accompanying drawings, and the novel features will be particularly pointed out in the appended claims.

Figures 1, 2, 3, 4, 5, 6:
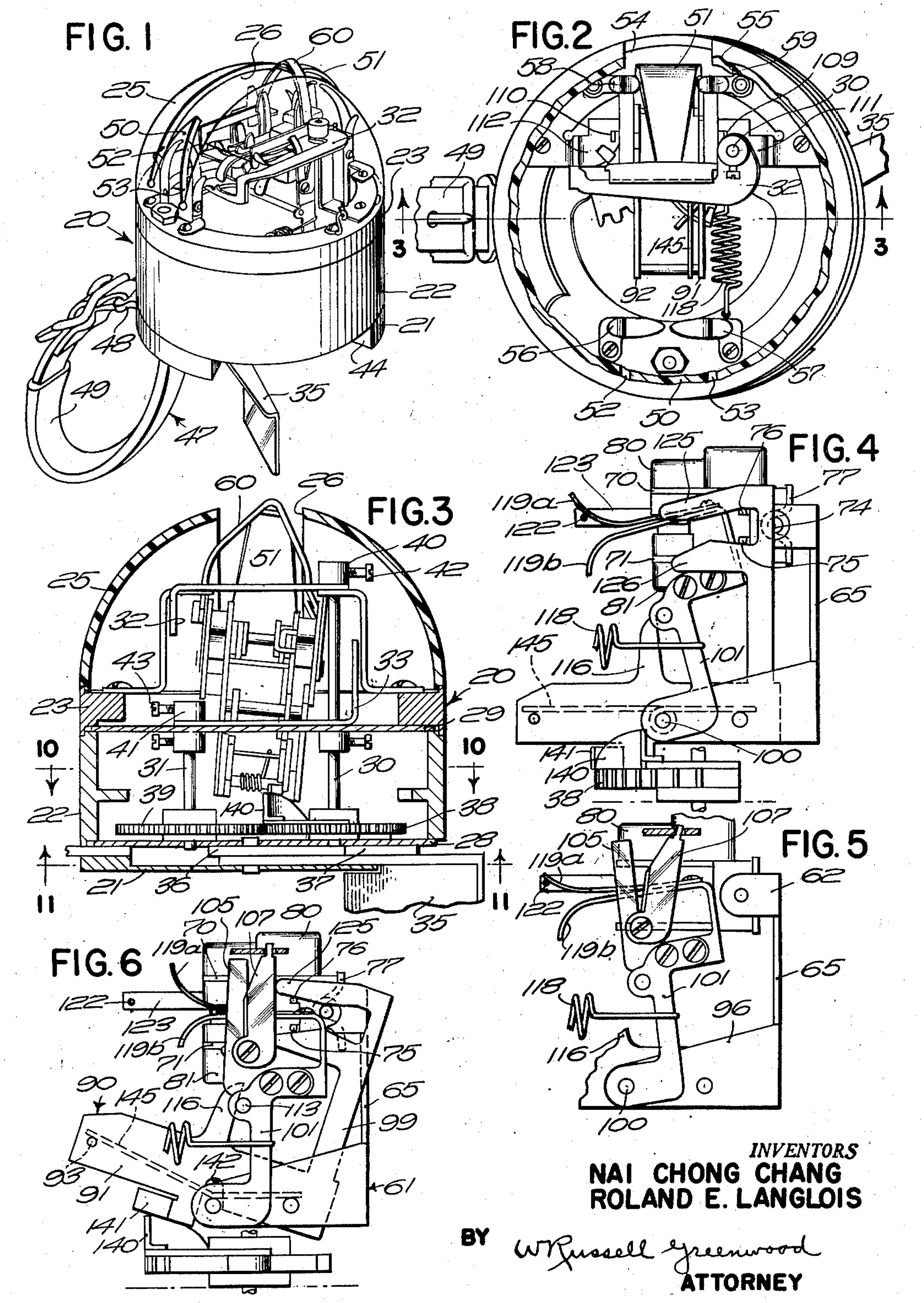
Fig. 1 is a perspective view, substantially full size, of one form of a yarn bonding device constructed in accordance with the present invention.
Fig. 2 is an enlarged plan view of the yarn bonding device shown in Fig. 1 with the dome-like cover thereof broken away and showing the final positions of the yarn transfer arms.
Fig. 3 is a vertical sectional view taken on the line 3—3 of Fig. 2 looking in the direction of the arows.
Figure 24:
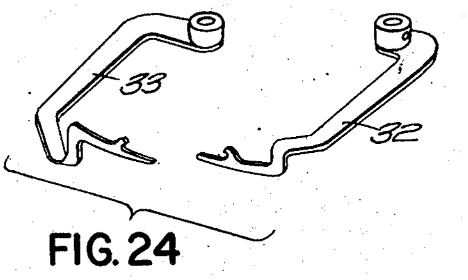
Figure 7:
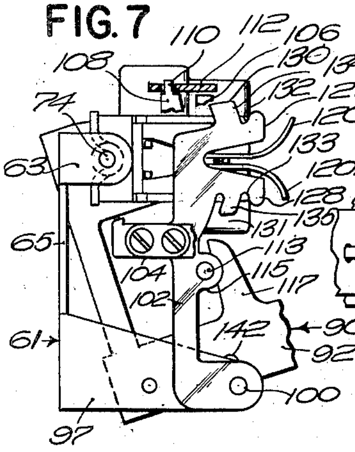
Figure 9:
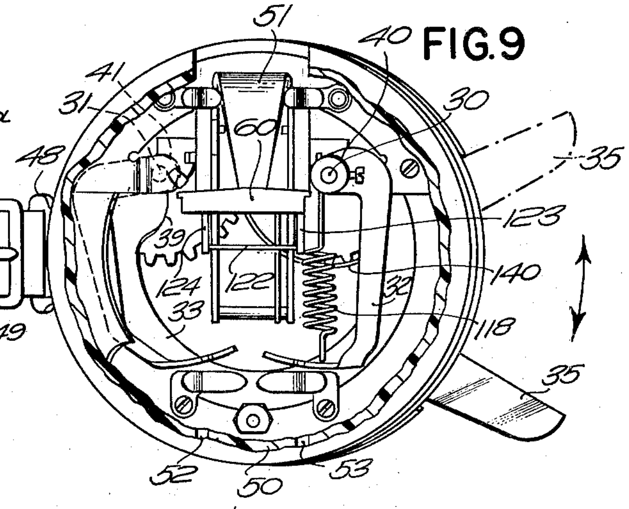
Figure 8:
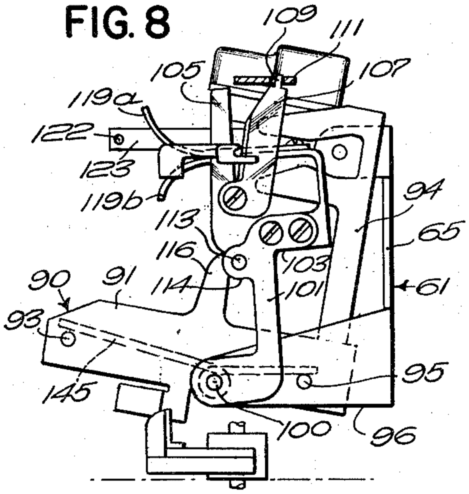
Figure 10:
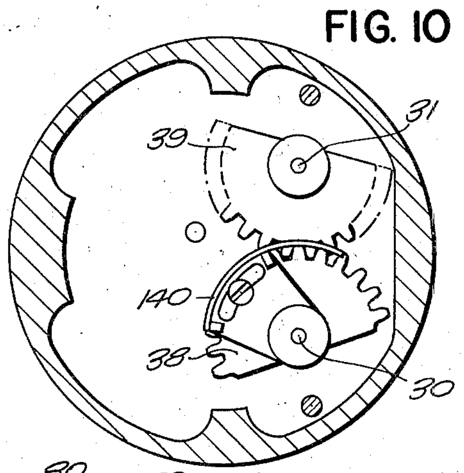
Figures 11, 12:
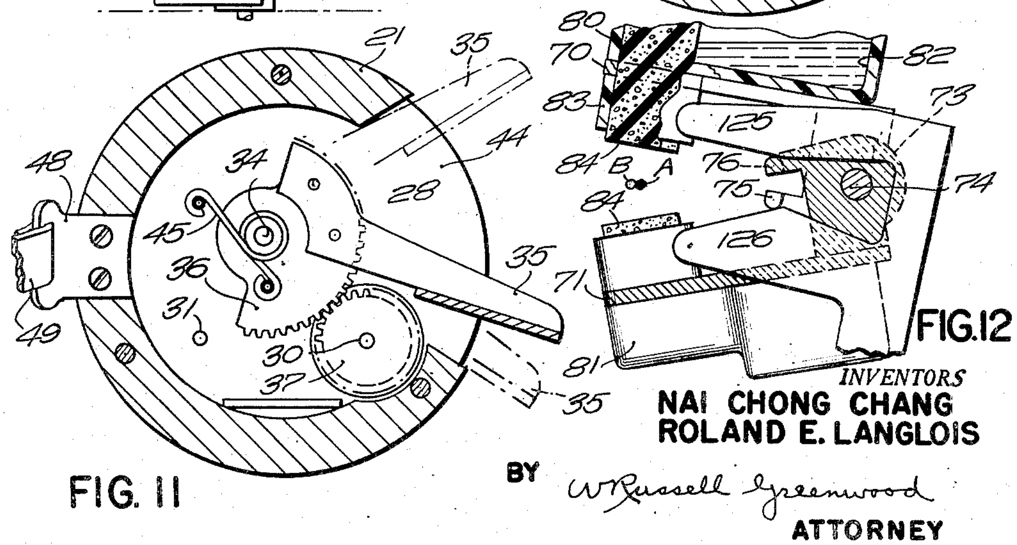
Figure 13:
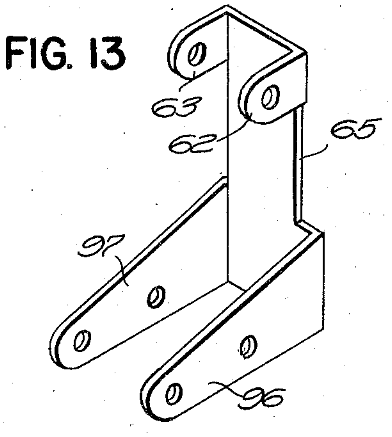
Figure 14:
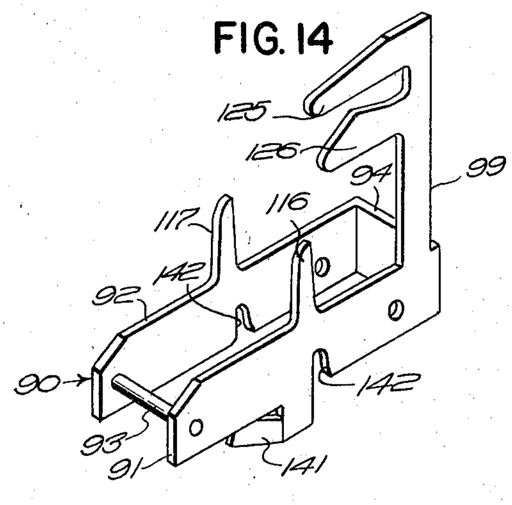
Figure 15:
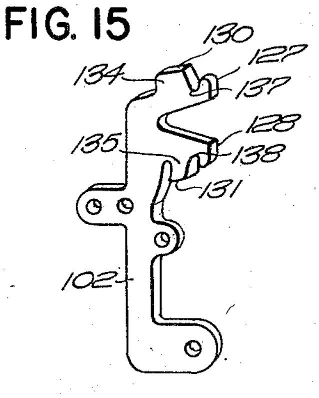
Figure 16:
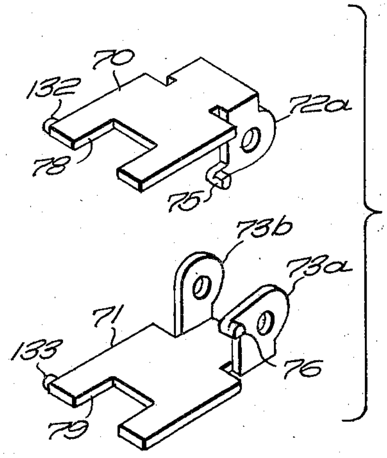
Figure 17:
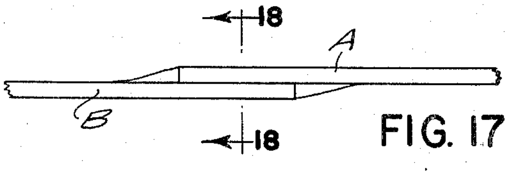
Figure 18:
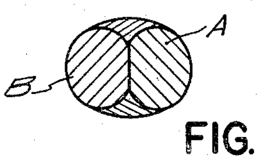

Fig. 4 is a detail view in side elevation, on greatly enlarged scale, of the bonding mechanism of the device as viewed from the right end of Fig. 2 and including the rockable yarn carriers for positioning the lapped yarn ends between the pad jaws, and the thumb-lever operated cam for actuating the yarn carriers and the jaws, the parts being shown in their initial position before crossing of the yarns to be bonded;

Fig. 5 is a detail view in side elevation on the same enlarged scale as Fig. 4 and similarly situated, showing the shearing cutters for severing the tails of the crossed yarns after they have been lapped and positioned between the pad jaws;

Fig. 6 is an enlarged view similar to Fig. 4 but showing the yarn carriers rocked rearwardly by the thumb-lever operated cam and with the pad jaws closed together on the bonded yarn joint at the completion of the yarn bonding operation, the yarns which are clamped in the clamps on the rockable yarn carriers being shown in exaggerated size for clarity;

Fig. 7 is an enlarged side elevational view of the left hand side of the bonding mechanism shown in Fig. 2;

Fig. 8 is an enlarged side elevational view of the bonding mechanism shown in Fig. 4 at the completion of the transferring operation of the yarn ends in parallel lapped position between the open pad jaws and immediately before forming a bonded joint by closing the pad jaws thereon;

Fig. 9 is an enlarged plan view similar to Fig. 2 with the dome-like cover broken away and showing the yarn transfer arms and the thumb operated lever in the initial positions prior to the bonding operation;

Fig. 10 is a sectional view taken on the line 10—10 of Fig. 3 showing the adjustable mounting of the main actuating cam of the device;

Fig. 11 is a sectional view taken on the line 11—11 of Fig. 3 showing the gearing arrangement of the thumb lever as viewed from its underside;

Fig. 12 is a fragmentary view, partly in section, of the pad jaws in the open position including the reservoirs for the liquid adhesive;

Fig. 13 is a perspective view, twice size, of the stationary frame member pivotally supporting the tilting frame member of the device;

Fig. 14 is a perspective view, twice size, of the tilting frame member of the device;

Fig. 15 is a pictorial view of the J-lever showing the cam surfaces for holding the pad jaws open during part of the operating cycle of the device and to release them into closed position upon the joint during the remainder of the operation of the device to effect union of the yarns;

Fig. 16 is an exploded view in perspective of the two pad support plates that carry the pad assemblies;

Fig. 17 is a top plan view showing the completed joint of the two yarns to be united with their tails severed and the yarn ends united in overlapped parallel position by the adhesive;

Fig. 18 is a cross-sectional view taken on line 18—18 of Fig. 17 through the final bonded joint;

Figs. 19 to 23 inclusive, are schematic views depicting the different positions of the yarn transfer arms and the yarns themselves at the successive stages in the operation of the device from the loading of two yarns or strands therein and their subsequent transfer, crossing, positioning between the jaws of the bonding mechanism to form a lapped joint without loose ends, final bonding of such joint, and the restoration of the yarn transfer arms to their initial position with the bonded yarns readied for removal from the device; and Fig. 24 is a perspective view of the yarn transfer arms.

The invention briefly described comprises, in general, a device having bonding means including a pair of movable jaws with pads for applying an adhesive, positioning means to orient a pair of yarns or threads to be joined and bring portions thereof from opposite directions into overlapping parallel relation and introduce them between the open pad jaws, means for cutting the loose ends or tails of the strands at opposite sides of the joint to produce a joint of predetermined length, and means for opening the pads for removal of the joined ends of the united yarns or threads from the pad jaws of the bonder. In the present embodiment, yarn transferring, crossing and positioning means are provided to create the joint and so constructed and arranged as to open the pad jaws of the bonding means during transferring movement of the yarn and to cause closing of the pad jaws immediately upon the bringing together of the yarns or threads into an overlapping parallel condition within the pad opening at which time the protruding yarn or thread ends are cut off to form a joint of predetermined length.

Further details of the invention will appear from the following description.

In the particular embodiment of the invention selected for the purposes of illustration only, the device shown in the drawings has a main body portion or casing generally designated 20 which is of a convenient size to handle and also to support and house the operative parts of the various mechanisms of the device, and this casing comprises a laminated structure built up of three hollow cylinders 21, 22 and 23 formed of suitable material such as either metal, for example aluminum, or a plastic, the cylinder sections being connected together by suitable screws or dowels in stacked relation one on the other as shown in Figs. 1 and 3 and topped by a removable hemispherical dome or cover 25 which may be formed of a transparent plastic as depicted in Fig. 1 for the purposes of illustrating the interior mechanism, but may be of sheet metal, if desired. As shown in Fig. 1, the dome 25 is provided with an elongated cut out portion or slotted opening 26 which extends along the arc of a great circle across the upper surface and partly down the sides of the dome through which opening a pair of yarns or strands whose ends are to be joined together are passed or loaded into the crossing and joint forming mechanism housed within the casing 20 and hereinafter to be described.

The casing is completed by the inclusion of two circular plates 28 and 29 between the successive cylinder sections 21 22 and 23 in alternately stacked arrangement therewith, and journaled in these plates are two upright pivot shafts 30 and 31 (see Fig. 3) which support and move a pair of swinging yarn transfer arms 32 and 33 (see Figs. 2 and 24) that constitute a part of the mechanism hereinafter to be described for mechanically crossing the strands and positioning their ends together to create a lapped joint prior to the bonding operation.

The lower plate 28 and the base cylinder 21 constitute the bearing supports for a pivot shaft 34 of a thumb lever 35 and its attached sector gear 36 (see Fig. 11) which furnish the motive means for actuating the operating mechanisms of the device. Meshing with the teeth of the sector gear 36 is a gear 37 (see Fig. 11) integral with the lower end of the pivot shaft 30 which can be considered to be the timing shaft of the device. Sector gears 38 and 39 integral with the shafts 30 and 31 respectively and meshing with each other in a 1:1 ratio serve to rotate the shafts together in opposite directions whenever the shaft 30 is turned by the gear 37 upon actuation of the thumb lever 35 to revolve the sector gear 36. The transfer arms 32 and 33 are mounted by their hubs 40 and 41 upon the upper ends of the pivot shafts 30 and 31 respectively and are secured thereto by screws 42 and 43 in the hubs of such arms. The thumb lever 35 has limited oscillatory movements to-and-fro in a slotted opening 44 provided in the side wall of the base cylinder 21. A coil spring 45 having one end secured to the underside of the lower plate 28 and the other end attached to the sector gear 36 normally holds the thumb lever 35 at the forward limit of its movement in the slot 44.

A handle member 47 consisting of a rigid angular metal arm is secured to the casing 20 by attachment to a plate 48 which is fixed in a recessed portion of the casing as shown in Fig. 11, and an adjustable hand loop 49 of leather or the like supported by the arm of the handle member and connecting it with the plate 48 is adapted to secure the device upon the hand of the operator while the handle is grasped in the palm of the operator's left hand during use of the device.

The assembly thus far described and as illustrated in Fig. 1 constitutes the casing structure and affiliated parts of the device and presents a completely smooth streamlined exterior contour which is devoid of any surfaces or projections to catch or break fine yarns or cause them to hang up on the device.

At each end of the slotted opening 26 through which the yarns or strands to be united are laid into the device there is provided a prong or divider that on the side of the device facing the operator as ordinarily held in the hand and as shown in Fig. 1, being designated by the numeral 50, and the other at the further side being designated by the numeral 51. Referring further to Fig. 1 it will be noted that both prongs or dividers 50 and 51 project upwardly following the curvature of the dome 25 and that on each side of each prong the edges on the slot of the dome form deep guide notches for receiving and maintaining the separation of the two yarns or strands to be joined together when initially laid parallel to each other in the notches during loading into the device. This is best shown in Fig. 2 wherein the end of the slot 26 nearest the operator's wrist is provided with two guide notches 52 and 53 which are separated by the prong 50 while the distal end of the slot 26 is provided with similar guide notches 54 and 55 in alignment with the notches 52 and 53 respectively and separated by the prong 51. Disposed interiorly of the dome 25 and mounted upon the top end of the upper cylinder section 23 in positions opposite the notches 52, 53, 54 and 55 respectively are pairs of upwardly extending spring clamp fingers 56, 57 58 and 59 respectively which hold the two yarns or strands aligned and in place in the respective notches 52, 53, 54 and 55.

A wishbone shaped part 60 has its apex projecting upwardly through the slot 26 and serves to deflect the pair of yarns or strands, whose ends are to be united, away from each other whereby they properly may be introduced into the cutters hereinafter to be described as the strands are brought down to the bottoms of the respective notches 52, 53, 54 and 55 in being loaded through the slot 26. The wishbone 60 is hung in a suspended relation and secured to the forward end of the divider 51 in a bridging relation forwardly of a pair of outwardly extending parallel side arms 62 and 63 integral with the upper part of a vertical back member 65 of the frame 61, and the wishbone 60 is inclined upwardly through the slot 26 and has its base firmly secured to the upper cylinder section 23 by means of the divider 51. The frame 61 functions as the main support for the bonder means and the cutter mechanism of the device presently to be described and is removably mounted in the casing 20 by the back member 65 of the frame being secured in a suitable recessed portion of the casing.

Referring now to Figs. 4 and 8, the bonder means herein employed in the device for uniting or cementing the joint created by the overlapped yarn ends comprises upper and lower movable pad support plates 70 and 71 provided at their respective inner ends with perforated ears 72*a*, 72*b* and 73*a* and 73*b* respectively which are loosely mounted on a cross pin 74 the ends of which are secured in the side arms 62 and 63 of the frame 61. Integral with the ears 72*a* and 73*a* and extending forwardly thereof in parallel spaced relation to the associated pad support plate are short stub pin projections 75 and 76 respectively the purpose of which will be explained in the description of the cutter mechanism hereinafter to be described. A torsion type coil spring 77 encircles the cross pin 74 (see Fig. 4) and is operatively arranged to bias the pad support plates 70 and 71 into a normally closed position.

The pad support plates 70 and 71 are provided with suitable longitudinal slots 78 and 79 (see Fig. 16) which extend inwardly of the forward edges of said plates to form forks into which are removably mounted the upper and lower pad assemblies 80 and 81 which are identical in their construction and contain the adhesive or cementing fluid. As shown in Fig. 12, each pad assembly is made up of a hollow plastic reservoir 82 and pad enclosing neck 83. The chamber within each reservoir member has a fluid capacity of about 1½ cc. and contains a supply of fluid adhesive material sufficient for an average eight hour day's use. A pad element 84 here shown as a piece of sponge rubber is held in the neck portion 83 and acts as a wick to feed fluid adhesive from the chamber of the reservoir 82. The entire pad assemblies 80 and 81 are considered to be expandable and both are to be changed daily at the beginning of a work shift of the textile mill. This practice is considered to be more economical than any attempt to clean or change the pad elements, or to reload their reservoirs with an eye dropper or other technique. The changing of the pad assemblies 80 and 81 consists simply in snapping them into the slots 78 and 79 at the front ends of the pad support plates 70 and 71.

Referring further to Fig. 4 and also to Figs. 5, 6, 7 and 8, the cutter assembly herein employed for severing the tails of the crossed yarn ends after the two yarns or strands have been transferred and crossed by the transfer arms 32 and 33 from an initial spaced parallel relation into an overlapping substantially straight parallel relation between and extending across the open cavity of the pad means, comprises an oscillatory or tiltable frame generally designated 90 having a U-shaped base formed by a pair of side plates 91 and 92 in spaced parallel relation connected by a cross rod 93 at their forward ends and at the rear by a back plate 94, the side plates being pivoted near their rearward ends upon a cross rod 95, for tilting movement as depicted in Fig. 6 upon a pair of spaced forwardly extending parallel side plates or arms 96 and 97 which are rigidly connected to the upright back member 65 of the stationary frame 61 and form the base portion thereof.

Pivoted upon a cross rod 100 secured in the outer ends of the base plates 96 and 97 exteriorly thereof are a pair of upwardly extending generally J-shaped levers 101 and 102 which have rigidly attached to their upper cross arms 103 and 104 the fixed cutting blades 105 and 106 of each of a pair of cutting blades which form the cutters that sever the tails of the two crossed yarns or strands as they are introduced into the open cavity between the pads of the bonder. Pivotally mounted on the respective fixed cutting blades 105 and 106 are the cooperating cutting blades 107 and 108 respectively of the cutters, and these last-named blades have their upper ends reduced and inserted through and have limited sidewise movement in short slots 109 and 110 which are formed in laterally upset ends of a pair of stationary upright brackets 111 and 112 which are mounted at opposite sides of the frame 61 and suitably secured to the top end of the upper casing section 23. The J-levers 101 and 102 are connected together by a cross tie rod 113 which is secured in bosses 114 and 115 of the respective levers (see Figs. 7 and 8) and this cross rod 113 is arranged to be engaged by a pair of upwardly extending prongs 116 and 117 formed integral with the side plates 91 and 92 respectively of the frame 90. A coil spring 118 which extends from front to rear of the casing 20, as shown in Fig. 2, and has one end anchored thereto and the other end hooked around the J-lever 101, see Figs. 4 and 5, holds the frame 90 and the J-levers in their forwardly swung position.

Disposed at opposite sides of the pad jaw mechanism and between the respective cutter assemblies and extending in a forward direction of both frames 61 and 90 are flexible clamp means to receive and grip the pair of crossed yarn ends after they have been positioned in a parallel overlapping relation and to introduce them as thus-arranged into the open cavity between the pad jaws, said clamp means being here shown as consisting of two spring assemblies 119 and 120, the assembly at the right side of the pad jaws being the upper spring finger and lower stationary finger 119*a* and 119*b* respectively, and the assembly at the left side being the upper spring finger and lower stationary finger designated 120*a* and 120*b* respectively (see Figs. 4, 6, 7 and 8). A stationary cross bar 122 held by arms 123 and 124 which are attached to the lower ends of the wishbone 60 tends to hold the upper spring fingers 119*a* and 120*a* in a raised position with respect to their respective lower fingers to receive the parallel overlapped strand ends during transferring and crossing by the transfer arms 32 and 33, when the oscillatory frame 90 is tilted forwardly in its initial or inactive position as shown in Fig. 4. As the operation proceeds from this stage the rearward motion of the frame 90 pulls the fingers 119*a* and 120*a* from the pin 122 as depicted in Figs. 7 and 8, thereby creating a clasping action against the bottom fingers 119*b* and 120*b* to grip the strands A and B.

The means for accomplishing opening and closing of the pad jaws including the support plates 70 and 71 and their respective pad assemblies 80 and 81 at the proper point in the operating cycle of the device where the crossed overlapped ends of the strands are to be introduced between the jaws of the bonder comprises a pair of forwardly extending cam elements 125 and 126 which are carried by the upper end of a long arm 99 upstanding from the rear part of the side plate 91 of the oscillatory frame 90, these cam elements being arranged one above the other at the left side of this frame, as shown in Figs. 4 and 6. Riding against the inclined cam surfaces of cam elements 125 and 126 are the stub pin projections 75 and 76 of the pad support plates 70 and 71 for moving them into open and closed positions.

Referring now to Fig. 7, the pivoted J-lever 102 at the left side of the device is provided at its upper end portion with a pair of forwardly projecting arms 127 and 128 which are angularly arranged one above the other in a diverging or V fashion and the respective arms have two cam surfaces 130 and 131 which contact pin-like projections 132 and 133 on the upper and lower pad support plates 70 and 71 respectively, these cam surfaces being formed at the outer ends of a pair of lugs 134 and 135 respectively which project outwardly in opposite directions from oppositely disposed intermediate portions of the respective upper and lower arms 127 and 128. Thus, the pin projections 132 and 133 are lifted from their initial positions behind and against the rearward face of the lugs 134 and 135 onto the cam surfaces 130 and 131 of the lugs 134 and 135 as the pad support plates 70 and 71 are spread apart by the cam elements 125 and 126 during backward tilting of the frame 90 from its initial or normal position shown in Fig. 4 to the intermediate tilted position shown in Fig. 8 of its pivotal movement backwards.

The pin projections 132 and 133 hold the pad support plates 70 and 71 wide apart, and consequently hold the bonder jaws open all the time that these pin projections bear against the respective cam surfaces 130 and 131 and rearward tilting movement of the frame is continuing. At the instant that the strand ends are introduced between the open jaws in a parallel overlapped state ready to be bonded into an integral body, the pin projections 132 and 133 abruptly slide off the forward edge of the cam surfaces 130 and 131 and, due to the pressure of the spring 78, snap inwardly into suitable recesses 137 and 138 formed in the arms 127 and 128 and situated forward of the base of the lugs 134 and 135 respectively. When this occurs, the oscillatory frame 90 will have assumed its rearmost tilted position as shown in Figs. 6 and 7, which occurs at the end of the bonding cycle, and the bonder pads will be tightly closed upon the yarn ends to form the final bonded joint. If desired, the pads may be notched to fit about the splice.

The means herein employed for tilting or rocking the pivoted frame 90 back and forth as the thumb lever 35 is depressed away from its starting position and restored thereto comprises a cam segment 140 adjustably mounted on the upper face of the sector gear 38, as shown in Figs. 3 and 10, which turns when the thumb lever 35 is depressed to rotate the attached sector gear 36, the cam being movable beneath and in contact with a follower finger 141 depending from the bottom face of the side plate 91 of the frame 90. The coil spring 118 acts to urge the side plate 91 downwardly with the cam follower 141 held in continuous engagement with the cam 140 at all times, while the initial or inactive position of the frame 90, as shown in Figs. 3 and 4, is determined by the adjusted position of the cam segment on the sector gear 38. Clearance slots 142 extending inwardly from the bottom edge of the respective side plates 91 and 92 receive the cross rod 100 on which pivot the J-levers 101 and 102 and allow the frame 90 to lean forwardly in its inactive or retracted position, as shown in Fig. 4.

The operation of the device may be summarized as follows: The device first is attached to and held in the left hand by the operator inserting his fingers through the handle member 47 and the strap 49 and is so arranged on the hand that when the left forearm is extended horizontally from his body with the palm of the hand held vertically, thumb up, the device will be well back of the last joint of the first finger of the operator's hand with the casing facing in the general direction shown in Fig. 1 and the thumb lever 35 being close to and in position to be engaged by the operator's left thumb. With the hand holding the device so arranged, it sits with the dome 25 upward and the two yarns or strands A and B to be joined then are laid into the respective guide notches 52, 54 and 53, 55 through the slot 26 in the hemispherical upper face of the dome 25 by an outward and downward sweeping motion of the operator's right hand, the correct parallel orientation of the two strands being insured by the prong dividers 50 and 51 during such loading operation. As the strands are brought down to the bottom of the guide notches 52, 53, 54 and 55 of the slot 26 they are deflected away from each other by the wishbone 60 so that they are properly introduced into the gaps of the open shearing cutters which, as shown in Figs. 5 and 6, include the left stationary blade 106, the left movable blade 108, the right stationary blade 105 and the right movable blade 107.

Figure 19:
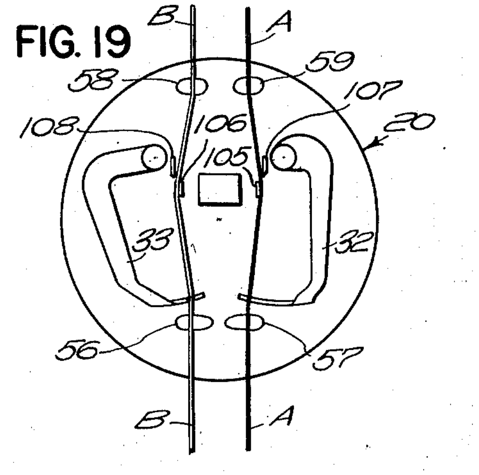
Figure 20:
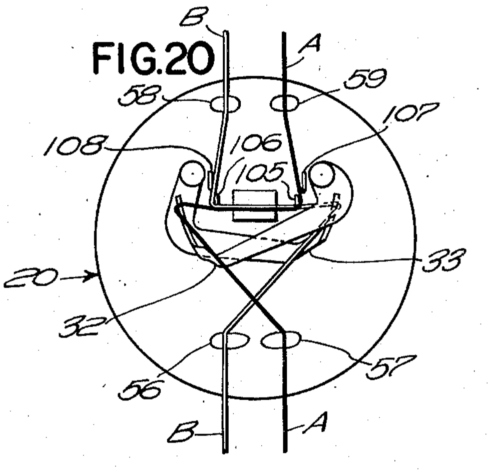
Figure 21:
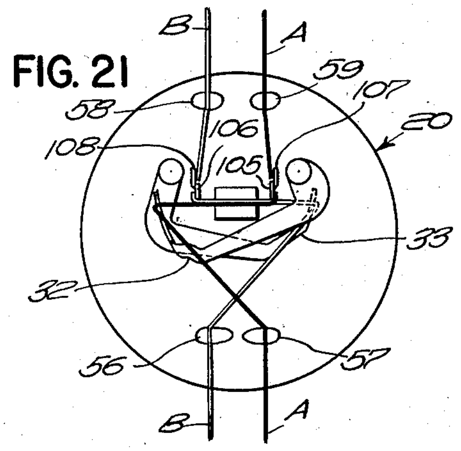
Figure 22:
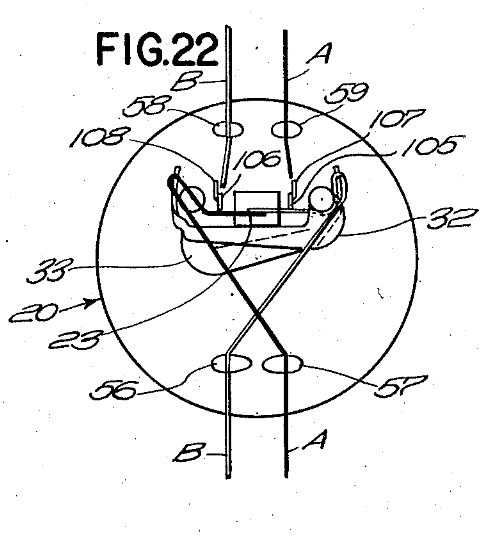
Figure 23:
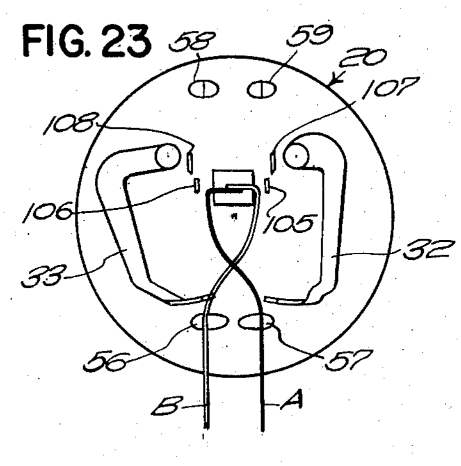

When the thumb lever 35 is depressed, it rotates sector gear 36, to which it is attached, and which in turn rotates gear 37 and simultaneously therewith rotates the pivot shafts 30 and 31 thereby swinging both transfer arms from a parallel position as shown in Figs. 9 and 19 rearwardly into the positions shown in Figs. 2 and 20 in the course of which movement the transfer arm 32 picks up the right hand yarn or strand A as initially positioned in the device, transfers it in an arc to the left and the rear, crossing it in front of and above the pad assembly, and introducing the laterally bent straight run of the strand in between the clamp elements constituted by the spring assemblies **119*a*, 119*b* and 120*a*, 120*b*. At the final end of this crossing stroke the strand is wrapped around the outside of stationary cutter blade 106 and extends through the cavity of the open pads. This orients the strand A properly within the pad opening. At the same time that the transfer arm 32 has operated as just described, the transfer arm 33 which is attached to the upper end of shaft 31 describes an equal and opposite arc to the right, transferring and crossing the left yarn or strand B across and into the pad opening, and introducing the laterally bent straight run thus formed between the same clamping elements gripping the crossed strand A, then wrapping it around the outside of the stationary cutting blade 105, from which it extends through the cavity of the open pads where it is positioned in overlapping engagement with strand A. In this position the two yarns or strands A and B are parallel to each other and extend in opposite directions within the pad opening. At this instant the right cutter assembly made up of blades 105 and 107 cuts the tail of the right strand A and the left cutter assembly made up of blades 106 and 108 cuts the tail of the left strand B. Further rearward swinging motion of the transfer arms 32 and 33 now pulls the cut tails linearly through the respective pairs of clamp fingers 119*a*, 119*b* and 120*a*, 120*b* until the severed ends of both yarns or strands A and B are positioned well within the pad cavity. The amount of overlap at this time governs the length of the resulting joint. This overlap can be adjusted by controlling the final extreme position to which thumb lever 35** can be depressed.

The pad and cutter assembly operate as follows: When sector gear 38 begins to rotate as the thumb lever 35 is first depressed, cam segment 140 wedgingly moves under the cam follower 141 to lift the side plate 91 and rearwardly tilt the frame 90, thereby swinging the cam elements 125 and 126 which are part of the back member of the frame 90 and in contact with the stub pin projections 75 and 76 of the pad support plates 70 and 71, with the result that the latter are spread apart and the two pin projections 132 and 133 on the opposite side thereof are lifted onto the cam surfaces 130 and 131 to hold the pad assemblies 80 and 81 from their normally closed position. In order to synchronize the opening of these pads with the insertion of the ends of the yarns or strands A and B to be joined into the pad opening, the linear extent of the cam surfaces is such that they function to hold the pads open until the strands are completely parallel, and properly positioned between the open pad assemblies. At that instant cam surfaces 130 and 131 abruptly release and pad support plates 70 and 71, and the pad assemblies close upon the yarn ends to be joined. During the rearward motion of J-levers 101 and 102 the movable cutter blades 107 and 108, which are pivoted on the fixed blades 105 and 106 respectively of these levers, are being acted upon by stationary brackets 111 and 112 to produce a shearing movement of the blades similar to that of closing scissors. This action follows since the tips of the movable cutting blades 107 and 108 are restrained by but rock slightly in the slots 109 and 110 in the brackets 111 and 112 thereby producing pivotal movement of these blades on their respective cooperating blades 105 and 106 as both the latter and the J-levers swing rearwardly in being pushed by the prongs 116 and 117 in contact with the cross bar 113 during backward tilting of the frame 90 by the cam 140. The motion is so timed that at the instant when the pad assemblies 80 and 81 have closed upon the crossed yarn ends, the cutter blades are closed and the tails of the strands A and B are cut. The final motion of the transfer arms 32 and 33 pulls the yarn ends within the clamped pads and completes the bonded joint by the application of adhesive material thereto.

The synchronizing of the tilting of the frame 90 with the rocking of the J-lever 101 is accomplished as follows: Prong 116 on the side plate 91 of the frame 90, as it moves to the rear, contacts cross rod 113 which is part of the J-levers 101 and 102. These J-levers, until acted upon by prong 116 are motionless and maintain the pad assembly in a normally closed position, as shown in Fig. 4. During the initial lifting of the side plate 91 by the movement of the cam 140 against the cam follower 141 before the prong 116 comes in contact with rod 113, the wedge-shaped elements 125 and 126 at the upper end of back member 94 of the frame 90 open the pad assembly. When prong 116 contacts the cross rod 113 it shifts the J-lever 102 rearwardly into a position where the cam surfaces 130 and 131 thereof and the pin projections 132 and 133 retain the pads in the open position while the cam elements 125 and 126 as they swing back fall away and lose control of the pads. At approximately the end of the backward swing of the frame 90 the pin projections 132 and 133 fall off the holding cam surfaces 130 and 131 and the pad assemblies 80 and 81 close upon the overlapped yarn or strand ends and unite them with adhesive.

With the forming of the bonded joint as previously described the forward limit of the stroke of the thumb lever 35 has been reached. On its reverse stroke the following takes place: Thread transfer arms 32 and 33 reverse their motion and are restored to their original positions. As cam segment 140 retracts from cam follower 141, cam elements 125 and 126 first open the pad assemblies 80 and 81 during the time the joint is withdrawn from between them, and then finally close the pads again as the thumb lever 35 approaches the end of its return stroke after the joint has been transferred forward while still held clamped between the pairs of spring fingers 119*a*, 119*b* and 120*a*, 120*b*. At the end of the return stroke the joint is completely free and the united yarns or strands A and B are ready to be removed manually from the device. There are provided several springs for reverse operation. One is the spring 145 which bears on the cross rod 93 to urge the frame 90 to its normal starting position. Another is the coil spring 118 which restores the J-levers 101 and 102 to their forwardly tilted initial position, as shown in Fig. 4. A third spring 77 provides the proper pressure for the pad assembly, and a fourth spring 45 restores the thumb lever 35 to its original position.

In the foregoing description and in the claims the term "yarn" has been used in a generic sense to include all analogous materials such as thread, strands, etc.

It will be understood that the invention is susceptible of embodiment in various forms of automatic power-operated constructions and such use also is contemplated to be within the scope thereof, in addition, to hand operation as is the form and operation of the device herein described embodying the invention.

Although one specific embodiment of the invention has been particularly shown and described for mechanically effecting the union of two yarns, threads or strands by producing a bonded joint or splice of the yarn ends, it will be understood that the invention is capable of modification and that various changes in the construction and in the arrangement of the various cooperating parts may be made without departing from the spirit or scope of the invention as defined and covered in the claims appended hereto.

What is claimed is:

1. A yarn bonding device comprising two opposed relatively movable pressing members arranged to apply a liquid adhesive composition onto interposed portions of the ends of two yarns in the region of a splice to be made thereto, means arranged to bring portions of both yarns from opposite directions and introduce them between said pressing members into overlapping parallel relation to each other and place such region of the splice thus-arranged where it can be subjected to simultaneous pressing engagement by said pressing members, and means operatively arranged to move said pressing members into pressing engagement with the interposed portions of both yarns and simultaneously therewith apply a liquid adhesive composition over the region of the splice to unite the yarns integrally with each other.

2. A yarn bonding device comprising two opposed movable pressing members one of which being arranged to apply a liquid adhesive composition onto interposed portions of the ends of two oppositely extending yarns in the region of a splice to be made thereto, means arranged to laterally deflect and position the end portions of both yarns toward each other and introduce them between said pressing members in an overlapping relation to each other and place such region of the splice thus-arranged where it can be subjected to the application of simultaneous pressure by said pressing members, and means operatively arranged to move said pressing members into pressing engagement with the interposed portions of both yarns and simultaneously with the application of pressure thereto apply a liquid adhesive composition over the region of the splice to unite the yarns integrally with each other.

3. A yarn bonding device comprising, in combination, two opposed movable jaw members each supporting a pad applicator and a reservoir for a liquid adhesive composition, said jaw members being arranged to be opened and closed about interposed portions of two yarns which are to be spliced, means for opening and closing said jaw members, and means for supporting and bringing together into contacting parallel overlapping relation portions of a pair of yarns which are to be united, and to place them into the path of the open jaw members for engagement by the pads thereof upon being closed into pressing engagement with the interposed strands to apply liquid adhesive onto the splice assembly and unite the ends of both yarns integrally to each other.

4. A yarn bonding device comprising, in combination, two opposed movable jaw members each including a pad applicator and a reservoir for a liquid adhesive material, said members being arranged to be opened and closed, means for opening and closing said members, and means for supporting in spaced substantially parallel condition a pair of strands to be united together, a portion of said supporting means being movable in such a manner as to bring portions of the ends of both strands into contacting parallel lapped relation and place them into the path of the open jaw members for engagement by the pads thereof upon being closed onto the interposed strands in pressing engagement therewith to apply adhesive over the region of the splice and bond the yarns integrally to each other.

5. A yarn bonding device comprising, in combination, two opposed movable jaw members arranged to be opened and closed, pad assemblies including a pad applicator and a closed reservoir for liquid adhesive, one mounted on each of said jaw members, means for opening and closing said jaw members, and means arranged at opposite sides of said jaw members for supporting in spaced substantially parallel condition a pair of strands to be united together, a portion of said supporting means being movable transverse across a plane containing the axes of both strands to bring portions of both strands into contacting parallel lapped relation and place them into the path of the open jaw member for engagement by said pads upon being closed onto the interposed strands in pressing engagement therewith to apply adhesive thereto over the region of the splice and unite them integrally.

6. A yarn bonding device comprising two opposed movable jaw members arranged to be opened and closed each including adhesive applying means adapted to apply a liquid adhesive composition to interposed ends of a pair of oppositely projecting yarns to be united, means for opening and closing said jaw members, means for supporting in spaced substantially parallel condition a pair of yarns which are to be united together, a portion of said supporting means being movable to place portions of both strands into contacting overlapping parallel relation between the open jaw members for engagement by the adhesive applying means thereof upon being closed onto the interposed strands to apply adhesive thereto over the region of the splice and bond the yarns integrally to each other, and means engaged by the operator and movable to actuate said movable portion of said yarn supporting means and said jaw opening and closing means in proper sequence to effect the formation of the splice and the bonded union of the ends of both yarns.

7. A yarn bonding device comprising two opposed movable jaw members arranged to be opened and closed each including a pad applicator and a reservoir for a liquid adhesive material composition for application to interposed ends of a pair of yarns to be united, means for opening and closing said jaw members, means separating and supporting in spaced substantially parallel condition a pair of yarns which are to be united together, and yarn transfer means for moving and crossing said strands and bringing portions thereof into contacting overlapping parallel relation and for introducing them into the opening between the open jaw members for engagement by the pad applicators upon being closed onto said interposed strands to apply adhesive thereto over the region of the splice and bond them integrally to each other, and means engaged by the operator and movable to actuate said yarn transfer means and said jaw opening means in proper sequence to effect the formation of the splice and the bonded union of the ends of both yarns.

8. A yarn bonding device comprising two movable pad supporting members arranged in opposed relation one above the other to form jaws to be opened and closed, replaceable pad assemblies one mounted on each of said jaws and including a closed liquid container adapted to contain a liquid adhesive composition to saturate the pads thereof and be applied thereby to interposed ends of a pair of yarns to be united, means for opening and closing said jaws, and means on opposite sides of said pad supporting means arranged for holding and supporting in spaced substantially parallel condition a pair of yarns which are to be united together, a portion of each of said holding and supporting means being arranged to project laterally into the path of the opposite strand to receive and hold a portion of it during initial positioning of the strands in the device and being movable therefrom to place such portions of both strands into contacting overlapping parallel relation between the open jaws for engagement by the pad assemblies carried thereby during closing of the jaws to move the pads into firm pressing engagement onto the interposed strands to forcibly apply adhesive material over the region of the splice and bond the yarns integrally to each other.

9. A yarn bonding device comprising two movable pad supporting means arranged in opposed relation one above the other to form jaws to be opened and closed, pad assemblies demountable on each of said jaws and including a liquid container containing a supply of liquid adhesive to saturate the pads thereof and be applied thereby to interposed ends of a pair of yarns to be united, means for opening and closing said jaws, clamp means separating and supporting in spaced substantially parallel condition a pair of yarns to be united together, and movable yarn transfer means initially positioned in alignment with said clamp means prior to operation of the device to receive portions thereof as they are laid into said clamp means and being movable therefrom during operation of the device for moving and crossing the strands to reverse their positions and place portions thereof into contacting overlapping parallel relation between the open pad assemblies for engagement thereby upon closing movement of said jaws to move the pads into pressing engagement onto said interposed strands to forcibly apply adhesive over the region of the splice and bond the yarn ends integrally to each other.

10. A yarn bonding device comprising two opposed movable pressing members arranged to be opened and closed each including a pad applicator means adapted to apply a liquid adhesive composition to interposed ends of a pair of yarns to be united, means for opening and closing said movable pad means, stationary clamp means disposed on opposite sides of said pressing members forwardly and rearwardly thereof, and arranged to support in spaced substantially parallel condition a pair of yarns to be united, one at one side of said pressing members and the other at the other side thereof, and two revolvable transfer members arranged in front of said pressing members each constructed to hold a strand, and each swingable in opposite directions transversely of the plane of closure of the pad pressing members and their applicator means to transfer, cross and place opposite parallel portions of both strands into contacting overlapping parallel relation between the open pressing members for engagement with the pad applicator means upon being closed onto the interposed strands to apply adhesive material thereto, and means engaged by the operator for initiating the operation of said transfer means and said opening and closing means for the pressing members in sequence to unite the ends of the strands integrally by application of adhesive over the region of the splice.

11. A yarn bonding device comprising two opposed movable pad supporting members arranged to be opened and closed each including a pad applicator means adapted to apply a liquid adhesive composition to interposed ends of a pair of yarns to be united, means for opening and closing said movable pressing members, front and rear sets of stationary clamp members arranged at opposite sides of said pressing members, the clamp members of the rear set being mounted substantially in parallel alignment with those of the front set to support in spaced substantially parallel condition a pair of yarns to be united, and two revolvable yarn transfer members each constructed to receive and support a portion of the opposite strand that is held in spaced parallel relation by the clamp members on the other side with the strand held by the clamp members positioned on the same side as each of the transfer members, said transfer members being swingable in opposite directions to and fro laterally in front of said pressing members to transfer, cross and place opposite parallel portions of both strands into contacting overlapping parallel relation between the open pressing members for engagement by the pad applicator means upon being closed onto the interposed strands to apply adhesive material thereto, and means engaged by the operator for initiating the operation of said transfer means and said opening and closing means for the pressing members in sequence to unite the ends of the strands integrally by application of adhesive over the region of the splice.

12. In a yarn bonding device, the combination of two opposed movable jaw members arranged to be opened and closed, each supporting a pad assembly including an absorbent pad element fed from a closed container for liquid adhesive, spring means normally biasing said jaw members into closed position, movable means including a cam portion for holding said jaw members in open position during introduction between the pad assemblies of interposed portions of a pair of yarns to be united, movable yarn positioning means arranged to bring together portions of the ends of both yarns together in contacting overlapping parallel relation from opposite directions and place the splice thus-arranged between the open jaws, clamp means proximate to said jaw members resiliently gripping both strands of the splice and holding it in extended relation through the gap between the open jaw members and during their closing onto the splice for the application of adhesive thereto, means for opening and closing said jaw members, and means engaged by the operator and movable to actuate said jaw opening and closing means, said movable means with the cam portion, and said movable yarn positioning means in proper sequence for placing the splice between the jaw members and effecting bonding thereof by the application of adhesive over the region of the splice by pressing of the pad elements onto the splice by the closed jaw members.

13. A yarn bonding device comprising, in combination, a hollow supporting body, a cover thereon slotted transversely thereof, a first frame within said supporting body and attached thereto, a second frame pivoted on the first frame for tilting movement forwardly and rearwardly thereof, two opposed pad support members arranged one above the other to form pressing jaws and pivoted on said first frame for movement into open and closed positions, pad assemblies mounted on each of said jaws and each including a pad element and a closed liquid container adapted to contain a liquid adhesive and feed it to said pad and be applied thereby during pressing of said pads onto interposed ends of a pair of yarns to be united, front and rear yieldable clamp means separating and supporting in spaced substantially parallel relation a pair of yarns to be united, said clamp means being mounted on said supporting body at positions beneath and proximate to the ends of the slot in said cover and on opposite sides of said first frame, with those on the same side being in alignment with each other, swinging clamp means on opposite sides of said first frame and movable bodily forwardly and rearwardly therewith for holding and introducing the overlapped parallel strands into the gap between the open pad pressing jaws, means movable with the second frame and arranged to effect backward swinging movement of said clamp means of the second frame as it swings rearwardly, two swinging yarn transfer members pivotally arranged on opposite sides of said first frame each provided with a laterally extending arm forwardly of said pad pressing jaws, and each constructed to support and hold a strand, said transfer members being arranged to be moved in unison to swing their respective arms from an initial position underlying and supporting the opposite strand during normal holding thereof by the clamp means on such side in spaced substantially parallel condition with a strand similarly held on the same side as the pivot for that particular arm by the clamp means on that side, and effect transferring and crossing of the portions held by such arms into contacting overlapping parallel relation and to insert them between said swinging clamp means and in an extended state through the gap between the open jaws, shearing cutters operative during swinging of said clamp means to cut off the tails of the yarn ends during introduction of the overlapped parallel strands into the gap between the open jaws by said swinging clamp means, rotatable cam means arranged for effecting rearward tilting movement of said second frame, and means engaged by the operator and movable to actuate said cam means, said transfer members, and to open and close said pad pressing jaws in a desired sequence to effect firm union of the ends of the strands by application of adhesive in the region of the splice.

14. A portable yarn bonding device comprising, in combination, a hollow supporting body, a cover thereon slotted transversely thereof, a first frame within said supporting body and attached thereto, a second frame pivoted on the first frame for tilting movement forwardly and rearwardly thereof, two opposed pad support members arranged one above the other to form pressing jaws and pivoted on said first frame for movement into open and closed positions, pad assemblies mounted on each of said jaws and each including an absorbent pad element and a closed liquid container adapted to contain a liquid adhesive and feed it to said pad and be applied thereby during pressing of said pads onto interposed ends of a pair of yarns to be united, front and rear spring clamp means separating and supporting in spaced substantially parallel relation a pair of yarns to be united, said clamp means being mounted on said supporting body at positions beneath and proximate to the ends of the slot in said cover and on opposite sides of said first frame, with those on the same side being in alignment with each other, swinging levers on opposite sides of said first frame and movable bodily forwardly and rearwardly thereon, spring clamp means on said levers and movable bodily therewith for holding and introducing the overlapped parallel strands into the gap between the open pad pressing jaws, means movable with the second frame and arranged to effect backward swinging movement of said clamp means of the second frame as it swings rearwardly, two swinging yarn transfer members pivotally arranged on opposite sides of said first frame each provided with a laterally extending arm forwardly of said pad pressing jaws, and each constructed to support and hold a strand, said transfer members being arranged to be moved in unison to swing their respective arms from an initial position underlying and supporting the opposite strand during normal holding thereof by the clamp means on such side in spaced substantially parallel condition with a strand similarly held on the same side as the pivot for that particular arm by the clamp means on that side, and effect transferring and crossing of the portions held by such arms into contacting overlapping parallel relation and insert them between said swinging spring clamp means and in an extended state through the gap between the jaws, shearing cutters associated with said swinging levers and operative to cut off the tails of the strand ends to a predetermined length of overlap during introduction of the splice into the gap between the open jaws by said swinging clamp means, rotatable cam means arranged for effecting rearward tilting movement of said second frame, and means engaged by the operator and movable to actuate said cam means, said transfer members, and to open and close said pad pressing jaws in a desired sequence to effect a bonded union of ends of the strands by application of adhesive in the region of the splice.

15. A yarn bonding device comprising support means including a handle member, cover member thereon slotted transversely across its top surface for loading into the device of a pair of yarn ends to be joined together, mechanism carried by said support means and also housed within said cover movably arranged to bring portions of the ends of two yarns into contiguous linear relationship to each other to form a lapped joint to be bonded integrally by a set liquid adhesive, said mechanism including retaining means for holding a pair of yarn end portions initially in spaced parallel relation, and transfer means movable to bring portions of said yarn ends into close linear proximity to form a lapped region of connection with each other, and adhesive-applying means operatively disposed to apply a settable flowable adhesive onto the end portions of the yarn ends which become said lap and effected upon further movement of said transfer means in the same direction after transferring the yarn end portions into the region where the lap is formed.

16. A yarn bonding device comprising support means including a handle connected thereto, a cover member thereon slotted transversely across its top surface for loading into the device of a pair of yarn ends to be joined together, mechanism carried by said support means and also partly situated interiorly of said cover movably arranged to bring portions of the ends of two yarns into contiguous linear relationship to each other to form a lapped joint of predetermined length to be bonded integrally by a set liquid adhesive, said mechanism including retaining means for holding a pair of yarn end portions initially in spaced parallel relation, transfer means movable to bring portions of said yarn ends into close linear proximity to form a lapped region of connection with each other, and means for severing the tails of said end portions a predetermined distance to provide lapped portions of said yarn ends of a predetermined length, and adhesive-applying means operatively disposed and arranged to apply a settable flowable adhesive onto the yarn ends which become said lap and effected upon further movement of said transfer means in the same direction immediately following the transfer thereby of the yarn end portions into the region where the lap is formed.

17. A yarn bonding device comprising, in combination, a pair of movable yarn transfer members pivotally arranged to move from one position for holding a pair of yarn ends placed initially in parallel relationship into a second position for crossing portions of said yarn ends laterally to bring them into close linear relationship to form a lap which is to be integrally bonded by a settable liquid adhesive binder, and means for applying a settable liquid adhesive binder onto said laterally disposed yarn end portions in an amount sufficient to coat and unite the lapped yarn ends integrally together.

18. A yarn bonding device comprising, in combination, a pair of movable yarn transfer members pivotally arranged to move from one position for holding a pair of yarn ends placed initially in parallel relationship into a second position for crossing portions of said yarn ends laterally to bring them into close linear relationship to form a lap which is to be integrally bonded by a settable liquid adhesive binder, means for applying a settable liquid adhesive binder onto said laterally disposed yarn end portions in an amount sufficient to coat and unite the lapped yarn ends integrally together, and means to remove said united yarn ends automatically from the region of said adhesive-applying means for subsequent removal by the operator from the device.

19. A yarn bonding device comprising, in combination, a hollow supporting body, a cover thereon slotted transversely thereof, a bonder device within and enclosed by said cover and including a reservoir for a supply of a settable liquid adhesive binder and provided with adhesive-applying means in opposed relation adapted to be fed from said reservoir, two swinging yarn-transfer members pivotally mounted at opposite sides of said bonder device, each provided with an arm extending forwardly of said bonder device and adapted to be swung laterally across and in front thereof to transfer a yarn in crossed relation to the opposite side of the bonder, clamp means for holding a pair of yarn ends in spaced parallel relation when initially inserted into the device, said transfer members being arranged to be moved in unison to swing their respective arms from an initial position for engaging and supporting said parallel yarn ends during initial holding thereof by the clamp means and effect transferring and crossing of the portions of the yarn ends held by such arms to bring them in close linear proximity to one another and in an extended condition crosswise through the region of the adhesive-applying means of the bonder, shearing cutters actuated upon continued movement of said transfer arms and operative to cut off the tails of the yarn ends to produce a predetermined length of overlap desired of the final bonded joint, and means engaged by the operator and movable to actuate said yarn-transfer arms and said cutters in a desired sequence to bring together in the bonding region predetermined lengths of the end portions of both yarns to form a lap joint of predetermined length and to effect a coating of the yarn ends by application of a settable liquid adhesive binder onto such end portions of the yarns by said adhesive-applying means.

20. The combination with two spaced applicator means for a fluid bonding material, of means to orient a yarn end to one of such applicator means, and means to orient a second yarn end to the other of such applicator means, said applicator means being adapted to apply fluid bonding material to said yarn ends as they are pulled therethrough in opposite directions so as to come together with the bond carrying portions forming a lapped joint.

21. In a device of the class described, the combination with two spaced applicator means for applying fluid bond forming materials, of means to orient and position a pair of yarn ends from opposite directions into contiguous relation for bonding prior to operation of said applicator means, said applicator means being adapted to apply fluid bond forming materials onto the separate yarn ends and coat them as they are moved relative to each other through said applicator means during orientation and positioning of the two coated yarn ends together into contact to form a lapped joint.

References Cited in the file of this patent

UNITED STATES PATENTS

| | | |
|---|---|---|
| 2,016,851 | Brady | Oct. 8, 1935 |
| 2,089,469 | Dix | Aug. 10, 1937 |
| 2,279,299 | Cavanaugh | Apr. 14, 1942 |
| 2,349,732 | Howard | May 23, 1944 |
| 2,449,349 | Waugh et al. | Sept. 14, 1948 |